(12) United States Patent
Fagerland et al.

(10) Patent No.: US 12,434,908 B2
(45) Date of Patent: Oct. 7, 2025

(54) METHOD FOR DISTRIBUTION OF STORAGE CONTAINERS IN AN AUTOMATED STORAGE AND RETRIEVAL SYSTEM

(71) Applicant: Autostore Technology AS, Nedre Vats (NO)

(72) Inventors: Ingvar Fagerland, Kolnes (NO); Uwe Gruenbeck, Nedre Vats (NO)

(73) Assignee: AutoStore Technology AS, Nedre Vats (NO)

( * ) Notice: Subject to any disclaimer, the term of this patent is extended or adjusted under 35 U.S.C. 154(b) by 826 days.

(21) Appl. No.: 17/754,404

(22) PCT Filed: Oct. 28, 2020

(86) PCT No.: PCT/EP2020/080295
§ 371 (c)(1),
(2) Date: Mar. 31, 2022

(87) PCT Pub. No.: WO2021/099082
PCT Pub. Date: May 27, 2021

(65) Prior Publication Data
US 2022/0340361 A1    Oct. 27, 2022

(30) Foreign Application Priority Data
Nov. 22, 2019   (NO) .................................... 20191395

(51) Int. Cl.
*B65G 1/04*      (2006.01)
*B65G 1/06*      (2006.01)
(Continued)

(52) U.S. Cl.
CPC .......... *B65G 1/0464* (2013.01); *B65G 1/065* (2013.01); *B65G 1/1371* (2013.01); *B65G 57/00* (2013.01);
(Continued)

(58) Field of Classification Search
CPC .... B65G 1/0464; B65G 1/065; B65G 1/1371; B65G 2203/0258; B65G 2203/042; B65G 1/00; G06Q 10/087
See application file for complete search history.

(56) References Cited

U.S. PATENT DOCUMENTS

2002/0102150 A1   8/2002  Dunstan
2012/0290125 A1  11/2012  Perry
2017/0140327 A1   5/2017  Lindbo

FOREIGN PATENT DOCUMENTS

CN    105270806 A    1/2016
CN    106066153 A   11/2016
(Continued)

OTHER PUBLICATIONS

M. Wulfraat "Swisslog Autostore: An In-Depth Review of Automated Split Case Picking Technology for Distrobution Centers" MWPVL; Apr. 1, 2012 (7 pages).
(Continued)

*Primary Examiner* — Thomas Randazzo
(74) *Attorney, Agent, or Firm* — Baker Botts L.L.P.

(57) ABSTRACT

A method for storing containers in an automated storage and retrieval system includes a framework structure including upright members, horizontal members and storage columns provided between the members. Storage containers are stackable in stacks within the storage columns. The method includes: defining a first storage area, wherein the first storage area includes specific storage columns within the framework structure; setting a first maximum weight threshold for the first storage area; determining a total weight for all storage containers stored in the first storage area; determining a weight for a further storage container which is to be stored within the framework structure; and determining a storage position for the further storage container to be within the first storage area if the sum of the total weight and the
(Continued)

weight of the further storage container is below the first maximum weight threshold, or determining the storage position for the further storage container to be outside of the first storage area if the sum of the total weight and the weight of the further storage container is above the first maximum weight threshold.

20 Claims, 4 Drawing Sheets

(51) Int. Cl.
  *B65G 1/137* (2006.01)
  *B65G 57/00* (2006.01)
  *G06Q 10/087* (2023.01)

(52) U.S. Cl.
  CPC ... *G06Q 10/087* (2013.01); *B65G 2203/0258* (2013.01); *B65G 2203/042* (2013.01)

(56) References Cited

FOREIGN PATENT DOCUMENTS

| | | | | |
|---|---|---|---|---|
| CN | 108229871 | A | 6/2018 | |
| CN | 109018803 | A | 12/2018 | |
| CN | 110304385 | A | 10/2019 | |
| EP | 0767113 | A2 | 4/1997 | |
| EP | 3743361 | B1 * | 4/2024 | ........... B65G 1/0464 |
| NO | 317366 | B1 | 10/2004 | |
| NO | 20180124 | A1 | 7/2019 | |
| NO | 344899 | B1 * | 6/2020 | ........... B65G 1/0464 |
| NO | 20191395 | A1 * | 5/2021 | ........... B65G 1/1371 |
| WO | 02059021 | A1 | 8/2002 | |
| WO | 2014075937 | A1 | 5/2014 | |
| WO | 2014090684 | A1 | 6/2014 | |
| WO | 2015193278 | A1 | 12/2015 | |
| WO | 2018146304 | A1 | 8/2018 | |
| WO | 2019138392 | A1 | 7/2019 | |
| WO | WO-2019145237 | A2 * | 8/2019 | ............... B65G 1/04 |
| WO | 2019179856 | A1 | 9/2019 | |

OTHER PUBLICATIONS

Search Report issued in Norwegian Application No. 20191395; Dated Jun. 12, 2020 (2 pages).
International Search Report issued in International Application No. PCT/EP2020/080295, mailed Feb. 16, 2021 (5 pages).
Written Opinion issued in International Application No. PCT/EP2020/080295; Dated Feb. 16, 2021 (8 pages).
Liu Jing, Search Report for Chinese Application No. 2020800805269, China Intellectual Property Office, dated Mar. 30, 2024, 6 pages (with translation).
Liu Jing, First Office Opinion Notice for Chinese Application No. 2020800805269, China Intellectual Property Office, dated Mar. 27, 2024, 8 pages (with translation).
Palais, Brieux, Office Action for European Patent Application No. 20799686.9, dated Nov. 15, 2024, 13 pages, pub. by the EPO, Rijswijk, Netherlands.

* cited by examiner

METHOD FOR DISTRIBUTION OF STORAGE CONTAINERS IN AN AUTOMATED STORAGE AND RETRIEVAL SYSTEM

FIELD OF THE INVENTION

The present invention relates to an automated storage and retrieval system for storage and retrieval of containers, in particular to such a system wherein the position of the containers is determined to prevent overload of a predetermined storage area. The present invention also relates to a method for storing containers in such a system to prevent overload of a predetermined storage area.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b, 301b, 201c, 301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b, 301b, 201c, 301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 ... n and Y=1 ... n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing.

These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106.

The storage containers 106 are today typically designed to carry not only the product items to be stored within the storage container 106 itself, but also to carry storage containers stacked above it. Hence, the worst condition for the storage container 106 is to be the lowermost storage container in the columns.

Present storage and retrieval systems 100 therefore has a limitation in how many storage containers that can be stacked above each other and the weight of each storage container. The present limits of the prior art storage system in FIG. 1 is that the maximum weight of each storage container (i.e. weight of storage container 106 and its product items 80) is 30 kg. and that a maximum of 14 storage containers 106 can be stacked above each other per column. These limitations have also influenced the maximum height of the grid, where the height of the grid typically corresponds to the height of fourteen storage containers. Until recently, these limitations have been sufficient for most storage systems.

Today, overloading of the storage containers 106 are avoided by computing the maximum number of product items per storage container 106, as the weight per product item in most cases are known from the manufacturer. In some storage systems, the weight of the storage containers 106 can be measured when there is doubt with respect to the 30 kg load limit. The weight of one type of storage containers used in present storage systems is ca 4-5 kg. Hence, each storage container may carry up to a weight of 25-26 kg. of product items.

In NO 20180124 a method for distribution of storage containers in an automated storage and retrieval system is described. Here, some storage containers are allowed to have a total weight above the 30 kg. limit, as long as other storage containers in the same stack have a lower weight. Hence, the total load on the lowermost storage container is still within the maximum load threshold of the storage containers. The method is first measuring the weight of a further storage container which is to be stored in the grid. Then the target column for the storage is determined based on the weight of the further storage container and the other storage containers in order to prevent overloading of the lowermost storage container.

Similar to the prior art above, the object of the present invention is also to provide a automated storage and retrieval system and a method for storing storage containers which can handle storage containers with a weight higher than the previously determined maximum weight. Hence, in the above example, the object is to be able to store storage containers with a total weight of more than 30 kg. Hence, the object is to provide an alternative solution to the above prior art.

Another object is to provide a method and system where the weight of each storage container including its product items (i.e. weight of the storage container itself and the product items stored within the storage container) can be increased without reducing the height of the stack of storage containers in each column.

In some buildings in which the automated storage and retrieval system is installed, the height inside allows for a grid with more than fourteen storage containers above each other. Hence, another object of the invention is to be able to better utilize the available space for storage purposes.

Another object of the invention is to achieve the above objects of the invention without increasing the cost per storage container considerably and hence be able to use the present type for storage containers. Another object is that the method and system can be implemented in an already existing storage system without too many modifications.

SUMMARY OF THE INVENTION

The present invention is set forth and characterized in the independent claims, while the dependent claims describe other characteristics of the invention.

The present invention relates to a method for storing containers in an automated storage and retrieval system, the system comprising a framework structure comprising upright members, horizontal members and storage columns provided between the members; where storage containers are stackable in stacks within the storage columns; where the method comprises the following steps:
defining a first storage area, wherein the first storage area comprises specific storage columns within the framework structure;
setting a first maximum weight threshold for the first storage area;
determining a total weight for all storage containers stored in the first storage area;
determining a weight for a further storage container which is to be stored within the framework structure; and
determining a storage position for the further storage container to be within the first storage area if the sum of the total weight and the weight of the further storage container is below the first maximum weight threshold, or
determining the storage position for the further storage container to be outside of the first storage area if the sum of the total weight and the weight of the further storage container is above the first maximum weight threshold.

In one aspect, the step of determining the weight for the further storage container comprises the step of:
calculating or measuring the weight at a port where product items are added to or retrieved from the further storage container.

In one aspect, the step of determining the weight for the further storage container comprises the step of:
weighing the further storage container by means of a weight sensor.

The weight sensor could be provided as part of the port. The weight sensor could be provided as part of the container handling vehicle. The weight sensor could be located as part of a conveyor, a roller or other transportation means provided for the purpose of transporting containers and/or product items into and/or out from the automated storage and retrieval system, i.e. in systems where such transportation means is used in addition to, or as an alternative to, ports. The transportation means may transport the container to a specific storage position within the framework structure, from where the container handling vehicle may pick the storage containers.

In one aspect, the method further comprises the step of:
transporting the further storage container to the storage position by means of a container handling vehicle.

The weight sensor may be located within the port. The weight sensor may be located on the container handling vehicle.

Alternatively, the weight may be calculated by the step of estimating the weight of each product item and the number of product items added to or retrieved from the storage container. The step of estimating the weight may comprise using a predetermined weight for each product item. In yet an alternative, each or all product items could be weighed by means of the weight before they are added to or after they have been retrieved from the storage container, as the weight of the storage container is considered known.

In one aspect, the method further comprises:
determining a maximum load that can be stacked above the storage containers; where the step of determining the storage position further comprises:
determining the storage position for the further storage container to be within a specific column inside, alternatively outside, of the first storage area if the sum of the weight of the further storage container and the weight of other storage containers above one of the storage containers in the stack within the same column is not exceeding the maximum load for one of the storage containers in the stack.

In many automated storage and retrieval systems, only one type of storage container is used. In such systems, the maximum load will typically be determined to be the same for all storage containers. In such a system, the lowermost storage container will always be the one storage container which has a load closest to its maximum load.

However, some systems may use two or more types of storage containers, where the maximum load is different for the types of storage containers. One example may be that there are two types of storage containers, a first type having first maximum load and a second type having a second maximum load, where the first maximum load is considerably higher than the second maximum load. Here, the first type of storage container may be the lowermost storage container and a storage container of the second type is located above the lowermost storage container. Here, the storage container of the second type may be closer to its maximum load than the lowermost container of the first type.

In one aspect, the method further comprises:
determining columns which has available storage space;
where the step of determining the storage position further comprises:
determining the storage position to be within one of the columns which has available storage space.

In one aspect, the step of determining columns which has available storage space comprises:
determining a height for each storage container;
determining an available height for each column;
where the step of determining the storage position further comprises:
determining the storage position for the further storage container to be within a specific column inside, alternatively outside, of the first storage area if the height of the further storage container is below the available height in the specific column.

The available height is typically calculated as the total height of the storage column minus the heights of all containers presently stored in the stack in that column.

This is of particular interest in automated storage and retrieval systems with two or more types of storage containers, where the types of storage containers have different heights.

In one aspect, the method further comprises:
determining a horizontal distance from the further storage container to the respective columns which has available storage space;
where the step of determining the storage position comprises:
determining the storage position to be within one of the columns which has the shortest horizontal distance.

The horizontal distance is determined based on the position where the container handling vehicle is picking up the further storage container.

In one aspect, the step of defining the first storage area comprises:
defining the first storage area as specific storage columns in which a lowermost storage position is provided at a height higher than the lowermost part of the framework structure.

In one aspect, the step of defining the first storage area comprises:
defining the first storage area as specific storage columns being suspended above the lowermost part of the framework structure.

In one aspect, the step of defining the first storage area comprises:
defining the first storage area as specific storage columns under which a building floor has weight constraints.

In one aspect, the method further comprises:
defining a second storage area, wherein the second storage area comprises specific storage columns of the framework structure or specific storage columns of a further framework structure;
setting a second maximum weight threshold for the second storage area;
determining a total weight for all storage containers stored in the second storage area;
where the step of determining the storage position for the further storage container further comprises:
determining the storage position for the further storage container to be within the second storage area if the sum of the total weight and the weight of the further storage container is below the second maximum weight threshold;
determining the storage position for the further storage container to be outside of the second storage area if the sum of the total weight and the weight of the further storage container is above the second maximum weight threshold.

The present invention also relates to an automated storage and retrieval system comprising:
a framework structure comprising upright members, horizontal members and storage columns provided between the members; where storage containers are stackable in stacks within the storage columns; where the framework structure comprises a rail system provided on top of the upright members and horizontal members;
a port where product items are added to or retrieved from the storage containers;
a container handling vehicle configured to move horizontally along the rail system;
a weight estimation or measuring device for estimating or measuring the weight of each storage container after one or more product items have been inserted to or retrieved from the storage container;
a storage control system provided in communication with the container handling vehicle and the weight estimation or measuring device, where the storage control system is configured to:
defining a first storage area, wherein the first storage area comprises specific storage columns of the frameworks structure;
setting a first maximum weight threshold for the first storage area;
determining a total weight for all storage containers stored in the first storage area;
determining a weight for a further storage container which is to be stored within the framework structure; and
determining a storage position for the further storage container to be within the first storage area if the sum of the total weight and the weight of the further storage container is below the first maximum weight threshold, or
determining the storage position for the further storage container to be outside of the first storage area if the sum of the total weight and the weight of the further storage container is above the first maximum weight threshold.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
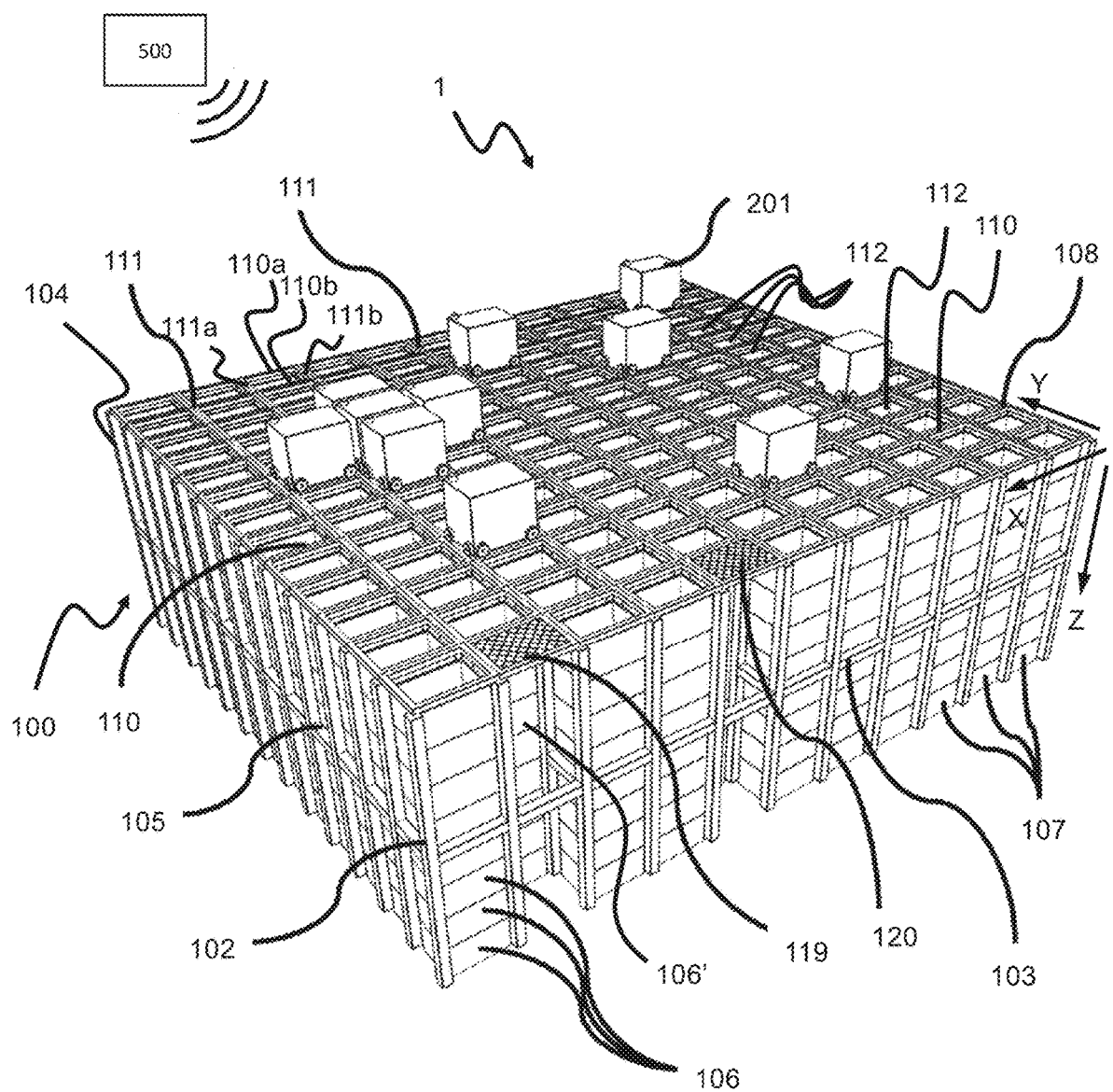
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
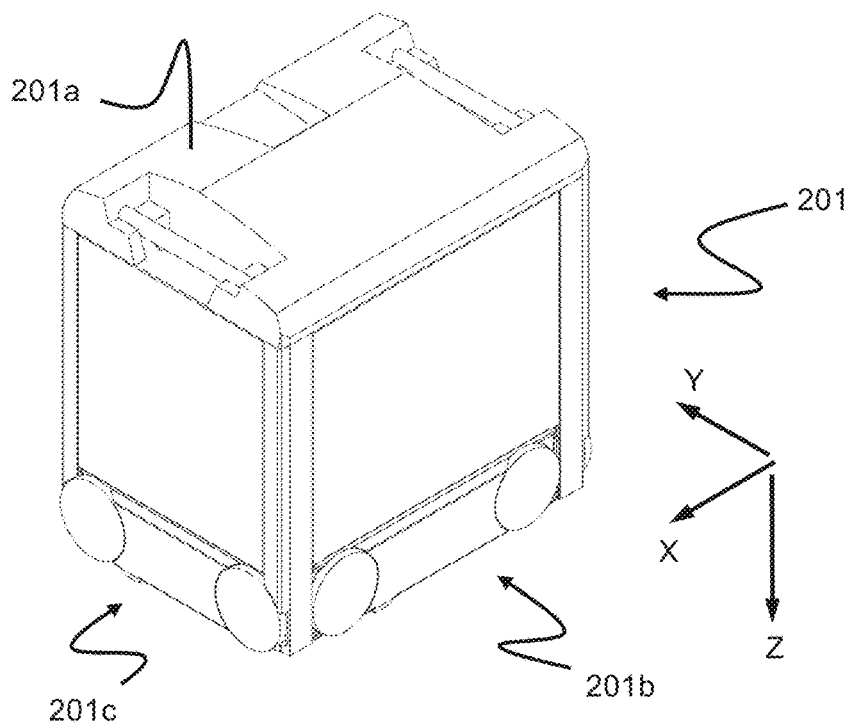
FIG. 2 is a perspective view of a prior art container handling vehicle having a centrally arranged cavity for carrying storage containers therein.
Figure 3:
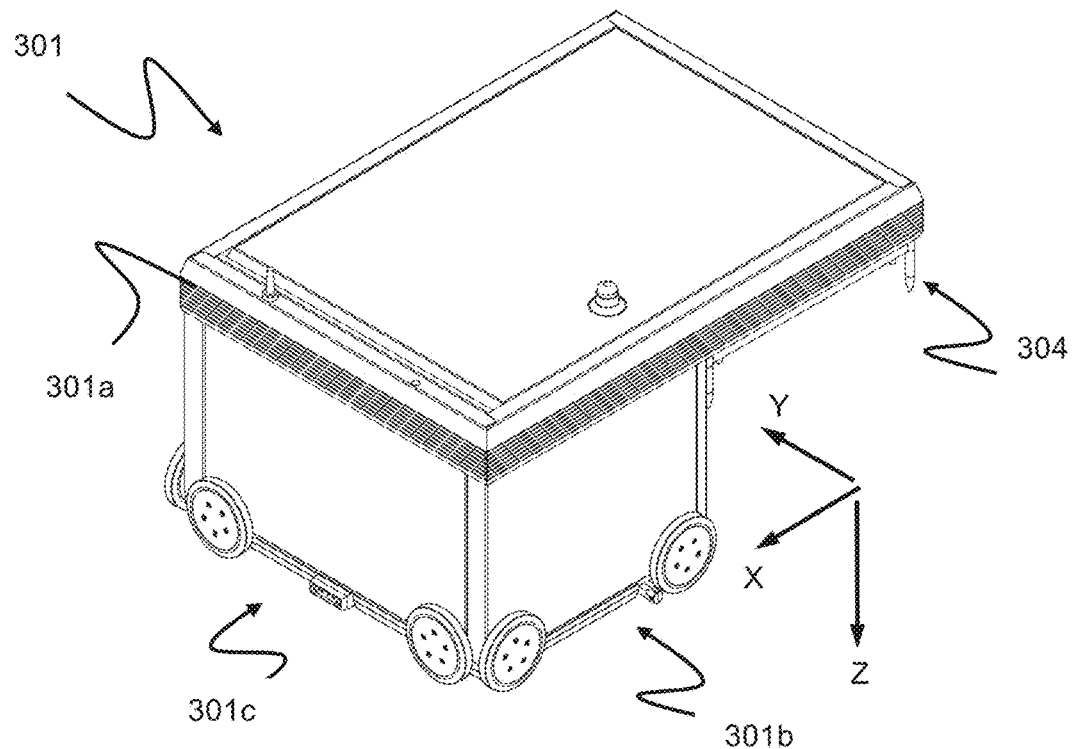
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 5-6.

Figure 5:
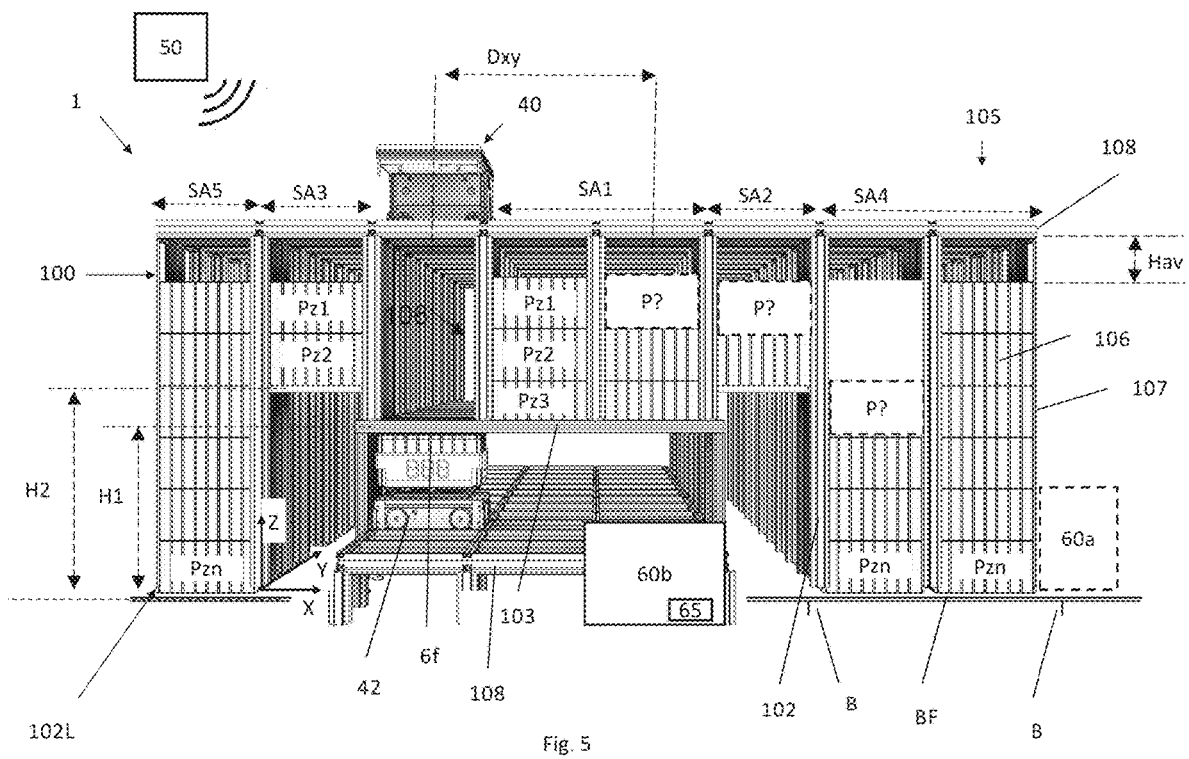
FIG. 5 illustrates a part of an automated storage and retrieval system where some of the lowermost storage containers are supported by the framework and not supported on the floor.
Figure 6:
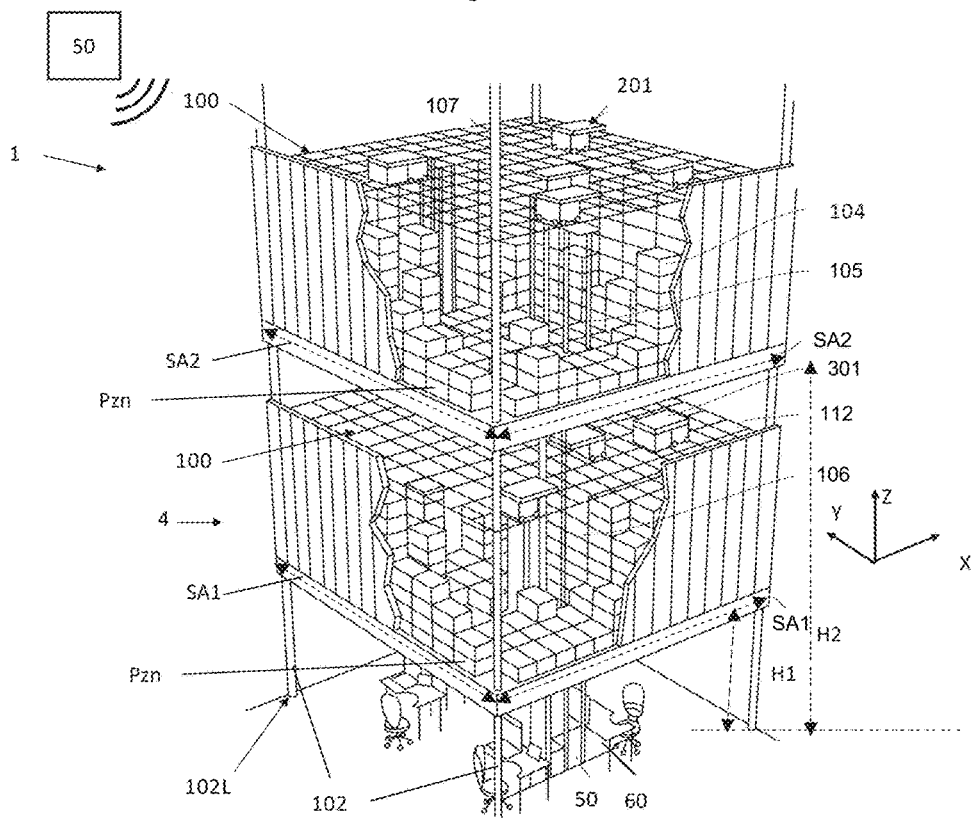
FIG. 6 illustrates an automated storage and retrieval system where all storage containers suspended by the framework structure above the building floor.

First, it is referred to FIG. 5, where the system 1 comprises a framework structure 100 comprising upright members 102, horizontal members 103 and an upper rail system 108 provided above the members 102, 103. Also here, the framework 100 comprises storage columns 105 in which storage containers 106 can be stacked in stacks 107. Container handling vehicles 40, similar to prior art container handling vehicles 301 operate on the upper rail system 108. As in prior art systems, containers stacked in the storage columns 105 are accessed by means of the container handling vehicle 40 operating on the upper rail system 108.

However, in contrast to FIG. 1, the height of the different storage columns 105 in FIG. 5 varies due to a second, lower rail system 108 provided below parts of the framework structure 100. A second type of container handling vehicle, in FIG. 5 indicated with reference number 42, is transporting storage containers horizontally on the lower rail system 108.

Different storage areas are indicated in FIG. 5 with letters SA, where each storage area comprises a number of pre-defined columns indicated by their respective X and Y positions. As shown, a first storage area SA1 has two columns in the X-direction and twelve columns in the Y-direction. Each column within the first storage area SA1 can have three storage containers stacked above each other, indicated as storage positions Pz1 (upper level), Pz2 and Pz3 (bottom level). It should be noted that only the z-direction is indicated in the storage positions in FIG. 5. Most often, each storage position has a unique storage position reference given by their X, Y and Z positions respectively. Typically, most storage positions will be occupied. In FIG. 5, some available storage positions are indicated with dashed rectangles denoted P?.

A second storage area SA2 can only have two storage containers stacked above each other in each column. The same is the case for a third storage area SA3.

A fourth storage area SA4 may have six storage containers may be stacked above each other.

It should be noted that some storage areas may be defined with columns not being adjacent to each other. It should further be noted that storage columns within the same storage area may have different heights, i.e. one storage area may have some columns where three storage containers can be stacked above each other and other columns where more than or fewer than three storage containers can be stacked above each other.

Figure 4:
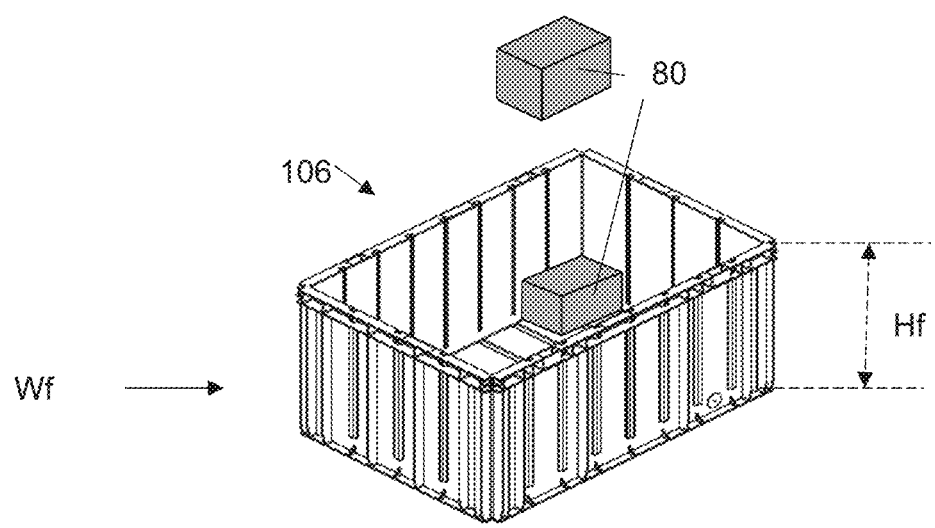
FIG. 4 is a perspective view of a storage container and product items stored in the storage container.

In FIG. 5, it is also indicated that the system 1 comprises ports 60a, 60b, where product items 80 (FIG. 4) are added to or removed from the storage containers. From the port 60a, the storage container is lifted directly up to the upper rail system by means of the lifting device (shown in FIG. 3 as 304) of a container handling vehicle 40, 201, 301. From the port 60b, the storage container is moved horizontally along the lower rail system 108 by means of the container handling vehicle 42 to a position below the container handling vehicle 40 on the upper rail system 108. Then, the storage container is lifted up from the container handling vehicle 42 to the container handling vehicle 40 by means of the lifting device of the upper container handling vehicle 40.

The total weight of the storage container (i.e. including the weight of product items within the storage container) changes when product items are added to or removed from the storage container at the ports 60a, 60b. A storage container which has recently visited the port 60b is shown to be transported by the container handling vehicle 42 operating on the lower rail system 108. In the system 1 shown in FIG. 5 a weight Wf of the storage container is estimated or measured, and this weight Wf is used when determining a new storage position P within one of the storage areas of the framework structure 100.

The weight Wf of the storage container can be measured by a weight sensor 65 provided within the port 60b. Also the port 60a may comprise such a weight sensor. Alternatively, a weight sensor may be provided as part of the container handling vehicles 40, 42. In yet another alternative the weight Wf may be calculated by estimating the weight of each product item and the number of product items added to or retrieved from the storage container. The step of estimating the weight may comprise using a predetermined weight for each product item. In yet another alternative, each or all product items could be weighed by means of the weight before they are added to or after they have been retrieved from the storage container, as the weight of an empty storage container is considered known.

In the system 1 shown in FIG. 5 there are some limitations with respect to the weight of the stacks in the columns of some storage areas. Hence, it is not possible to store a full height of storage containers carrying its maximum weight in all columns of some storage areas. Some examples will be discussed below. In these examples, the storage container having a maximum weight of 30 kg including product items as discussed in the introduction above has been used. It should be noted that the invention of the present application is not limited to this specific type of storage container. The present invention may be used in systems with other types of storage containers having a different net weight, different load capacity and different strength with respect to how many containers that can be stacked above each other.

Example 1

The framework structure 100 has a limitation with respect to the total weight of the first storage area SA1. As is shown, the first storage area 1 is suspended within the framework structure 100, and the weight of the storage containers within the first storage area is carried by the members 102, 103.

The term "suspended" is here used to describe that the lowermost storage position Pzn of a column is provided at a height H1 higher than the lowermost part 102L of the framework structure 100. The notation "zn" refers to the depth or z-level within the respective columns, where n is a number. For example, n=2 in the second storage area SA2, n=3 in the first storage area SA1 and n=6 in the fifth storage area SA5.

This limitation may be present in the entire lifetime of the system 1. Alternatively, this type of limitation is only present in a relatively short period of time, for example due to maintenance, repair etc. of the framework structure 100, in which period of time the framework structure may carry less weight than normal.

For the above reasons, a first maximum weight threshold Wmax1 is set for the first storage area SA1. Typically, the maximum weight threshold Wmax1 is lower than the maximum weight of one fully loaded storage container multiplied by the number of possible storage positions within the storage area. As mentioned in the introduction above, the maximum weight of each storage container (i.e. weight of storage container 106 and its product items 80) is 30 kg in one type of prior art storage system. The storage area SA1 has two columns in the X-direction, twelve columns in the Y-direction, and n=3 in the Z-direction. Hence, the first maximum weight threshold Wmax1 for the first storage area SA1 may be determined to be set to a specific weight lower than 30 kg*2*12*3=2160 kg. As an example, the first maximum weight threshold Wmax1 could be temporarily set to 1000 kg.

Example 2

Here, the framework structure 100 has a limitation with respect to the total weight of the second storage area SA2. As is shown, the second storage area 2 is also suspended within the framework structure 100, and the weight of the storage containers within the second storage area is carried by the members 102, 103.

Here, the lowermost storage position Pz0 of a column is provided at a height H2 which is also higher than the lowermost part 102L of the framework structure 100.

A second maximum weight threshold Wmax2 is set for the second storage area SA2. The storage area SA2 has 1 columns in the X-direction and 12 columns in the Y-direction, where the maximum height is 2 containers. Hence, the first maximum weight threshold Wmax1 for the first storage area SA1 may be set to be lower than 30 kg*1*12*2=720 kg. As an example, the second maximum weight threshold Wmax2 could be temporarily set to 300 kg.

It is also possible to set the second maximum weight threshold Wmax2 to be temporarily set to 0 kg, i.e. that no storage containers will be given a storage position within the second storage area SA2.

Example 3

Here, the framework structure 100 has a limitation with respect to the total weight of the fourth storage area SA4. This is due to a weakness in the building floor BF being supported by beams B. As above, such a weakness may be permanent or it may be temporary. Another example of such a situation is when the area surrounding the building has been flooded, and gravel or other material under the building floor has been partially washed away.

It should be noted that in this example, the lowermost storage position Pzn of columns within the fourth storage area SA4 is provided at the same height as the lowermost part 102L of the framework structure. Hence, in this example, the fourth storage area SA4 is not considered to be suspended within the framework structure 100. Moreover, the weight of the storage containers within the fourth storage area SA4 is carried by the building floor BF, not by the members 102, 103 of the framework structure 100.

Operation

The method according to exemplary embodiments of the present invention will now be described with reference to the first example above. The method is performed by the control system 50, which is provided in communication with the port 60a and/or the port 60a, the container handing vehicle 40, the delivery vehicle 42 etc.

Typically, this control system will correspond to the prior art control system 500, but with the added functionality described below.

Initially, as described above, the first maximum weight threshold Wmax1 for the first storage area SA1 has been determined. It is here assumed that all other storage areas indicated in FIG. 5 do not have such weight thresholds. Alternatively, maximum weight thresholds may be set for other storage areas as well.

In addition, the weight Wf for the further storage container 6f which has recently been at the port 60b has been determined.

As the weight Wf for all storage containers has been measured or calculated, the control system 50 has stored the storage position (X-, Y- and Z-position) and weight of each storage container in the system 1. Of course, a lot of other information has also been stored in the control system 50.

Based on the information in the control system 50, the total weight Wtot1 for all storage containers 6 presently stored in the first storage area SA1 is determined.

The storage position P for the further storage container 6f is now to be determined to be within the first storage area SA1 if the sum of the total weight Wtot1 and the weight Wf of the further storage container 6f is below the first maximum weight threshold Wmax1. However, if this condition is not fulfilled, i.e. the sum of the total weight Wtot1 and the weight Wf of the further storage container 6f is above the first maximum weight threshold Wmax1, the storage position P for the further storage container 6f is determined to be outside of the first storage area SA1. In this way, overloading of the first storage area SA1 is avoided.

The above weight consideration may be one of many steps to determine the storage position P for the further storage container 6f.

In one aspect, a maximum load Wloadmax is determined for each storage container or for each type of storage container used in the system 1, where this maximum load Wloadmax is defining the maximum weight that can be stacked above the storage container before it collapses due to the weight stacked above it.

Here, a further step for determining the storage position P for the further storage container 6f may comprise to check if the sum of the weight Wf of the further storage container 6f and the weight of other storage containers 106 above one of the storage containers 106 in the stack within the same column 105 is not exceeding the maximum load Wloadmax for the one storage containers 106 in the stack 107. If not exceeded, the storage position P will be determined to be within the or one of the columns which fulfills this criteria. If no such storage position P is found within the first area SA1, then storage positions P outside of the first storage area SA1 must be considered.

In many automated storage and retrieval systems 1, only one type of storage container is used. In such systems, the maximum load Wloadmax will typically be determined to be the same for all storage containers. In such a system, the lowermost storage container will always be the one storage container 106 which has a load closest to its maximum load Wloadmax.

However, some systems may use two or more types of storage containers, where the maximum load Wloadmax1, Wloadmax2, . . . WloadmaxN is different for the types of storage containers 106. One example may be that there are two types of storage containers, a first type having first maximum load Wloadmax1 and a second type having a second maximum load Wloadmax2, where the first maximum load Wloadmax1 is considerably higher than the second maximum load Wloadmax2. Here, the first type of storage container may be the lowermost storage container and a storage container of the second type is located above the lowermost storage container. Here, the storage container of the second type may be closer to its maximum load Wloadmax2 than the lowermost container of the first type.

Before or after checking the maximum load Wloadmax for the containers in each column, it is determined that the storage position P must be within one of the columns 105 which has available storage space. In particular, this is important in systems with more than one type of storage containers, where the different types of containers have different heights.

First, a height Hf for each storage container 6f, 106 is determined. Then an available height Hav for each column 105 is determined. The available height Hav is typically calculated as the total height of the storage column 105 minus the heights of all containers 106 presently stored in the stack 107 in that column 105.

Now, the step of determining the storage position P further comprises to determine the storage position P for the further storage container 6f to be within a specific column 105 if the height Hf of the further storage container 6f is below the available height Hav in that specific column 105. If no such storage position P is found within the first area SA1, then storage positions P outside of the first storage area SA1 must be considered.

As mentioned above, there may be two (or even more) storage areas with weight constraints in a system 1. It is now assumed that also the second storage area SA2 of FIG. 7 has weight constraints, i.e. that a second maximum weight threshold Wmax2 has been set to be lower than the maximum weight of one container multiplied with the number of possible storage positions in the second storage area SA2.

The following steps are now performed, after the second storage area SA2 and its second maximum weight threshold Wmax2 has been determined and if it has been determined that the storage position P cannot be within the first storage area SA1 as described above. Then, it is checked if the storage position can be within the second storage area SA2.

In similar way as for the first storage area SA1 above, the total weight Wtot2 for all storage containers 106 stored in the second storage area SA2 is determined.

Then, the storage position P for the further storage container 6f is determined to be within the second storage area SA2 if the sum of the total weight Wtot2 and the weight Wf of the further storage container 6f is below the second maximum weight threshold Wmax2. If not, i.e. if the sum of the total weight Wtot2 and the weight Wf of the further storage container 6f is above the second maximum weight threshold Wmax2, the storage position P for the further storage container 6f is determined to be outside of the second storage area SA2.

Yet a further step for determining the storage position P for the further storage container 6f may comprise taking a horizontal transportation distance into consideration.

Here, a horizontal distance Dxy from the further storage container 6f to the respective columns 105 which have available storage space is determined, as indicated in FIG. 5. The horizontal distance Dxy is determined from the column where the container handling vehicle 40 is picking up the further storage container 6f. The storage position P is then determined to be within one of the columns 105 which has the shortest horizontal distance Dxy According to the above, it is achieved that overloading of a storage area is prevented. Moreover, several other factors are taken into consideration, such as the maximum load which can be stacked above a storage container in a storage column, available height in each column, and horizontal transportation distance.

The result is that even though some parts of the framework structure is temporarily or permanently weaker than other parts of the framework structure, or even though some areas of the building floor is temporarily or permanently weaker than other parts of the building floor, the system 1 may continue its operation without substantially reduced efficiency.

In the preceding description, various aspects of the method and the automated storage and retrieval system have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS (1) automated storage and retrieval system
(6) storage containers
(6f) further storage container
(40) container handling vehicle
(42) delivery vehicle
(50) control system (60a) port
(60b) port
(65) weight sensor
(80) product item
(100) framework structure
(102) upright members
(102l) lowermost part of the upright members
(103) horizontal members of framework structure
(104) storage grid
(105) storage column
(106) storage container
(106') particular position of storage container
(107) stack
(108) rail system
(110) parallel rails in first direction (x)
(110a) first rail in first direction (x)
(110b) second rail in first direction (x)
(111) parallel rail in second direction (y)
(111a) first rail of second direction (y)
(111b) second rail of second direction (y)
(112) access opening
(119) first port column
(120) second port column
(201) prior art storage container vehicle
(201a) vehicle body of the storage container vehicle 101
(201b) drive means/wheel arrangement, first direction (x)
(201c) drive means/wheel arrangement, second direction (y)
(301) prior art cantilever storage container vehicle
(301a) vehicle body of the storage container vehicle 101
(301b) drive means in first direction (x)
(301c) drive means in second direction (y)
(304) gripping device
(500) prior art control system
(bf) building floor
(sa1) first storage area
(sa2) second storage area
(sa3) third storage area
(sa4) fourth storage area
(sa5) fifth storage area
(h1) height
(h2) height

The invention claimed is:

1. A method for storing containers in an automated storage and retrieval system, the system comprising a framework structure comprising upright members, horizontal members and storage columns provided between the members; where storage containers are stackable in stacks within the storage columns; wherein the method is performed by a control system and comprises:
defining a first storage area, wherein the first storage area comprises specific storage columns within the framework structure;
setting a first maximum weight threshold for the first storage area;
determining a total weight for all storage containers stored in the first storage area;
determining a weight for a further storage container which is to be stored within the framework structure; and
determining a storage position for the further storage container to be within the first storage area if a sum of the total weight and the weight of the further storage container is below the first maximum weight threshold, or
determining the storage position for the further storage container to be outside of the first storage area if the sum of the total weight and the weight of the further storage container is above the first maximum weight threshold.

2. The method according to claim 1, wherein the method further comprises:
determining a maximum load that can be stacked above the storage containers;
wherein the determining the storage position further comprises:
determining the storage position for the further storage container to be within a specific column inside, alternatively outside, of the first storage area if the sum of the weight of the further storage container and the weight of other storage containers above one of the storage containers in a stack within a same column is not exceeding the maximum load for one of the storage containers in the stack.

3. The method according to claim 1, wherein the defining the first storage area comprises:
defining the first storage area as specific storage columns in which a lowermost storage position is provided at a height higher than a lowermost part of the framework structure, optionally wherein the defining the first storage area comprises:
defining the first storage area as specific storage columns being suspended above the lowermost part of the framework structure.

4. The method according to claim 1, wherein under the specific storage columns, a building floor temporarily or permanently has stricter weight constraints.

5. The method according to claim 1, wherein the method further comprises:
defining a second storage area, wherein the second storage area comprises specific storage columns of the framework structure or specific storage columns of a further framework structure;
setting a second maximum weight threshold for the second storage area;
determining a total weight for all storage containers stored in the second storage area;
wherein the determining the storage position for the further storage container further comprises:
determining the storage position for the further storage container to be within the second storage area if the sum of the total weight and the weight of the further storage container is below the second maximum weight threshold;
determining the storage position for the further storage container to be outside of the second storage area if the sum of the total weight and the weight of the further storage container is above the second maximum weight threshold.

6. The method according to claim 1, wherein the method further comprises:
determining columns which has available storage space;
wherein the determining the storage position further comprises:
determining the storage position to be within one of the columns which has available storage space.

7. The method according to claim 6, wherein the determining columns which has available storage space comprises:
determining a height for each storage container;
determining an available height for each column;

wherein the determining the storage position further comprises:
determining the storage position for the further storage container to be within a specific column inside, alternatively outside, of the first storage area if the height of the further storage container is below the available height in the specific column and/or
wherein the method further comprises:
determining a horizontal distance from the further storage container to the respective columns which has available storage space;
wherein the determining the storage position comprises:
determining the storage position to be within one of the columns which has a shortest horizontal distance.

8. A control system for storing containers in an automated storage and retrieval system, the automated storage and retrieval system comprising a framework structure comprising upright members, horizontal members and storage columns provided between the members; where storage containers are stackable in stacks within the storage columns;
wherein the control system is configured to:
define a first storage area, wherein the first storage area comprises specific storage columns within the framework structure;
set a first maximum weight threshold for the first storage area determining a total weight for all storage containers stored in the first storage area;
determine a weight for a further storage container which is to be stored within the framework structure; and
determine a storage position for the further storage container to be within the first storage area if a sum of the total weight and the weight of the further storage container is below the first maximum weight threshold, or
determine the storage position for the further storage container to be outside of the first storage area if the sum of the total weight and the weight of the further storage container is above the first maximum weight threshold.

9. The control system according to claim 8, wherein the control system is further configured to:
determine a maximum load that can be stacked above the storage containers;
wherein the determining the storage position further comprises:
determining the storage position for the further storage container to be within a specific column inside, alternatively outside, of the first storage area if the sum of the weight of the further storage container and the weight of other storage containers above one of the storage containers in a stack within a same column is not exceeding the maximum load for one of the storage containers in the stack.

10. The control system according to claim 8, wherein the defining the first storage area comprises:
defining the first storage area as specific storage columns in which a lowermost storage position is provided at a height higher than a lowermost part of the framework structure,
optionally wherein defining the first storage area comprises:
defining the first storage area as specific storage columns being suspended above the lowermost part of the framework structure.

11. The control system according to claim 8, wherein under the specific storage columns, a building floor temporarily or permanently has stricter weight constraints.

12. The control system according to claim 8, wherein the control system is further configured to:
define a second storage area, wherein the second storage area comprises specific storage columns of the framework structure or specific storage columns of a further framework structure;
set a second maximum weight threshold for the second storage area;
determine a total weight for all storage containers stored in the second storage area;
wherein determining the storage position for the further storage container further comprises:
determining the storage position for the further storage container to be within the second storage area if the sum of the total weight and the weight of the further storage container is below the second maximum weight threshold;
determining the storage position for the further storage container to be outside of the second storage area if the sum of the total weight and the weight of the further storage container is above the second maximum weight threshold.

13. The control system according to claim 8, wherein the control system is further configured to:
determine columns which has available storage space;
wherein determining the storage position further comprises:
determining the storage position to be within one of the columns which has available storage space.

14. The control system according to claim 13, wherein determining columns which have available storage space comprises:
determining a height for each storage container;
determining an available height for each column;
wherein determining the storage position further comprises:
determining the storage position for the further storage container to be within a specific column inside, alternatively outside, of the first storage area if the height of the further storage container is below the available height in the specific column,
and/or
wherein the control system is further configured to:
determine a horizontal distance from the further storage container to the respective columns which has available storage space;
wherein determining the storage position comprises:
determining the storage position to be within one of the columns which has a shortest horizontal distance.

15. A non-transitory computer-readable medium comprising a computer program which, when executed by a control system for storing containers in an automated storage and retrieval system, the automated storage and retrieval system comprising a framework structure comprising upright members, horizontal members and storage columns provided between the members, where storage containers are stackable in stacks within the storage columns, causes the control system to:
define a first storage area, wherein the first storage area comprises specific storage columns within the framework structure;
set a first maximum weight threshold for the first storage area determining a total weight for all storage containers stored in the first storage area;
determine a weight for a further storage container which is to be stored within the framework structure; and determine a storage position for the further storage container to be within the first storage area if a sum of the total weight and the weight of the further storage container is below the first maximum weight threshold, or determine the storage position for the further storage container to be outside of the first storage area if the sum of the total weight and the weight of the further storage container is above the first maximum weight threshold.

16. The non-transitory computer-readable medium according to claim 15, wherein the computer program further causes the control system to:

determine a maximum load that can be stacked above the storage containers;

wherein determining the storage position further comprises:

determining the storage position for the further storage container to be within a specific column inside, alternatively outside, of the first storage area if the sum of the weight of the further storage container and the weight of other storage containers above one of the storage containers in a stack within a same column is not exceeding the maximum load for one of the storage containers in the stack.

17. The non-transitory computer-readable medium according to claim 15, wherein defining the first storage area comprises:

defining the first storage area as specific storage columns in which a lowermost storage position is provided at a height higher than a lowermost part of the framework structure, optionally wherein defining the first storage area comprises:

defining the first storage area as specific storage columns being suspended above the lowermost part of the framework structure.

18. The non-transitory computer-readable medium according to claim 15, wherein under the specific storage columns, a building floor temporarily or permanently has stricter weight constraints.

19. The non-transitory computer-readable medium according to claim 15, wherein the computer program further causes the control system to:

determine columns which has available storage space;

wherein determining the storage position further comprises:

determining the storage position to be within one of the columns which has available storage space.

20. The non-transitory computer-readable medium according to claim 19, wherein determining columns which have available storage space comprises:

determining a height for each storage container;

determining an available height for each column;

wherein determining the storage position further comprises:

determining the storage position for the further storage container to be within a specific column inside, alternatively outside, of the first storage area if the height of the further storage container is below the available height in the specific column, and/or wherein the computer program further causes the control system to:

determine a horizontal distance from the further storage container to the respective columns which has available storage space;

wherein determining the storage position comprises:

determining the storage position to be within one of the columns which has a shortest horizontal distance.

* * * * *